United States Patent [19]

Wallen

[11] Patent Number: 5,030,676

[45] Date of Patent: Jul. 9, 1991

[54] UV LIGHT STABILIZED POLYVINYL CHLORIDE COMPOSITION

[75] Inventor: J. Michael Wallen, Lindsborg, Kans.

[73] Assignee: Certainteed Corporation, Valley Forge, Pa.

[21] Appl. No.: 380,142

[22] Filed: Jul. 14, 1989

[51] Int. Cl.$^5$ ............................ C08K 5/58; C08K 3/22
[52] U.S. Cl. .................................... 524/182; 524/413; 524/436
[58] Field of Search .................... 524/182, 413, 436

[56] References Cited

U.S. PATENT DOCUMENTS

| | | | |
|---|---|---|---|
| 3,446,765 | 5/1969 | Reading | 524/436 |
| 3,567,669 | 3/1971 | Georgiana et al. | 524/178 |
| 3,776,672 | 12/1973 | Heilmayr | 425/72 |
| 3,890,268 | 6/1975 | Tanzilli | 260/42.29 |
| 3,899,561 | 8/1975 | Heilmayr | 264/177 |
| 4,100,325 | 7/1978 | Summers | 428/334 |
| 4,125,702 | 11/1978 | Cooke | 526/323 |
| 4,183,777 | 1/1980 | Summers | 156/243 |
| 4,193,898 | 3/1980 | Miller | 260/23 |
| 4,247,506 | 1/1981 | Summers | 264/177 |
| 4,255,320 | 3/1981 | Brecker | 524/181 |
| 4,289,818 | 9/1981 | Casamayor | 428/43 |
| 4,296,062 | 10/1981 | Gauchel | 264/173 |
| 4,380,597 | 4/1983 | Erwied | 524/109 |
| 4,514,449 | 4/1985 | Budich | 428/76 |
| 4,555,541 | 11/1985 | Reid et al. | 524/413 |
| 4,619,957 | 10/1986 | Reid et al. | 524/413 |
| 4,778,856 | 10/1988 | Chen | 525/190 |
| 4,786,350 | 11/1988 | Nesbitt | 264/177.16 |

OTHER PUBLICATIONS

Robert S. Hallas: Plastics Engineering, May 1976, pp. 15-19.
W. S. Castor et al., *Additives, for Plastics*, vol. 1, pp. 233-248, Raymond B. Seymour Editor (1978).
E. Kiesche, Plastics Technology (Jul. 1987), pp. 52-55.
R. A. Leaversuch, Modern Plastics (Feb. 1987) pp. 46-49.
G. R. Smoluk, Modern Plastics (Jul. 1988) pp. 46-49.
G. R. Smoluk, Modern Plastics (Nov. 1988) pp. 56-57, 60-65.
"Titanium Compounds (Inorganic)", p. 140-Kirk Othmer Encyclopedia Tech. vol. 23 (1983).
"The Chemical Nature of Chalking in the Presence of Titanium Dioxide Pigments", pp. 163-182-Photodegradation and Photostabilization of Coatings-ACS (1981).
"Compounding of Polyvinyl Chloride", *Encyclopedia of PVC*, vol. 2, pp. 21, 82, 556 (1988).

*Primary Examiner*—Veronica P. Hoke
*Attorney, Agent, or Firm*—Paul & Paul

[57] ABSTRACT

An improved unplasticized polyvinyl chloride composition for forming articles for exterior use such as house siding and window profiles includes a polymeric organic impact modifier, at least one thermal dehydrochlorination stabilizer, and an ultraviolet stabilization system. The ultraviolet stabilization system includes from about 0.2-15 parts by weight of the polyvinyl chloride resin of rutile titanium dioxide and less than about 5 parts by weight of the polyvinyl chloride resin of magnesium oxide. Inclusion of magnesium oxide in the unplasticized polyvinyl chloride composition permits the extrusion of ultraviolet resistant siding and window profiles including relatively low levels of titanium dioxide.

15 Claims, 2 Drawing Sheets

UV LIGHT STABILIZED POLYVINYL CHLORIDE COMPOSITION

BACKGROUND OF THE INVENTION

1. Field of the Invention

The present invention relates generally to unplasticized polyvinyl chloride compositions, and more specifically to an unplasticized polyvinyl chloride composition for external use having improved resistance to ultraviolet degradation.

2. Brief Description of the Prior Art

Polyvinyl chloride is among the most widely used of synthetic organic polymer materials. Plasticized polyvinyl chloride compositions are widely encountered as, for example, "vinyl" sheet goods and as objects formed from plastisols. Polyvinyl chloride is commercially available in a variety of grades, some of which are suitable for preparing rigid, plasticizer-free compositions for extrusion. Polyvinyl chloride is subject to thermal degradation by dehydrochlorination. Since many processes for forming useful objects from polyvinyl chloride compositions, such as extrusion and molding, subject the composition to elevated temperatures, most include thermal stabilizing agents which tend to inhibit the thermal degradation of the polymer during processing. Examples of commonly employed thermal stabilization agents include barium/cadmium, and organotins including alkyl mercaptides, maleates and carboxylates.

Polyvinyl chloride is also subject to degradation by exposure to ultraviolet light. Articles formed from polyvinyl chloride compositions which are exposed to ultraviolet light, such as "vinyl" siding, and vinyl window and window frame components ("profiles") typically include an ultraviolet stabilizer. Among the most widely used ultraviolet stabilizers is titanium dioxide pigment. Filling a polyvinyl chloride composition with this pigment substantially reduces the effective depth of penetration of ultraviolet light into the surface of an article formed from such a composition. While rutile titanium dioxide is highly reflective at visible wavelengths, it is also highly absorptive at ultraviolet wavelengths. However, although titanium dioxide is a highly effective ultraviolet light stabilizer for polyvinyl chloride compositions, it does have several serious drawbacks. An important disadvantage is the cost of titanium dioxide which has historically tended to be high compared with, for example, filler or extender pigments such as calcium carbonate, talc, and the like. Another significant disadvantage of using titanium dioxide as an ultraviolet stabilizer in unplasticized polyvinyl chloride compositions is that historically titanium dioxide has been periodically in short supply.

The relatively high cost of titanium dioxide is an especially significant disadvantage for the manufacture of articles for exterior use from unplasticized polyvinyl chloride compositions because such articles must often have substantially greater dimensions, for structural reasons, than the effective penetration depth of ultraviolet light in the articles. For example, profiles for constructing windows often have highly complex cross-sectional shapes, and multiple surfaces which are not exposed to ambient exterior light (and ultraviolet radiation) when the windows have been assembled and installed. Because the titanium dioxide is typically randomly distributed through the article, the bulk of the titanium dioxide is not located near the external surface, and thus plays no role in resisting ultraviolet degradation. Decreasing the level of titanium dioxide in the composition will tend to increase the effective penetration depth of ultraviolet light, and will consequently accelerate the degradation of the polyvinyl chloride and reduce the service life of the article.

It would be highly desirable to be able to reduce the level of titanium dioxide in such a composition without experiencing a concomitant increase in the rate of degradation and reduction in service life.

SUMMARY OF THE INVENTION

The present invention provides an improved unplasticized polyvinyl chloride composition having an ultraviolet light stabilizing system including titanium dioxide at a reduced level compared with prior art compositions, yet providing comparable ultraviolet resistance. The present invention can be used to formulate unplasticized polyvinyl chloride compositions which can be used to manufacture articles for a variety of exterior applications including exterior "vinyl" siding and structural and trim components for "vinyl" windows and the like ("profile extrusions").

The present invention provides an unplasticized polyvinyl chloride composition for forming articles for external use and of the type having a polymeric organic impact modifier. The composition comprises polyvinyl chloride resin, at least one thermal dehydrochlorination stabilizer, and an ultraviolet stabilization system. Preferably, an organotin stabilizer, such as an organotin mercaptide or carboxylate, is used, preferably at a level of from about 0.1-3 parts by weight of stabilizer per hundred parts by weight of the polyvinyl chloride resin.

The ultraviolet stabilization system consists essentially of from about 0.2-15 parts, and preferably from about 0.5-5 parts, by weight of rutile titanium dioxide per hundred parts by weight of the polyvinyl chloride resin, and less than about 5 parts, and preferably less than about 2 parts, by weight of magnesium oxide per hundred parts by weight of the polyvinyl chloride resin. Preferably the magnesium oxide has a small average particle size, such as no greater than about 2.20 microns.

DETAILED DESCRIPTION OF THE PREFERRED EMBODIMENTS

Figure 1:
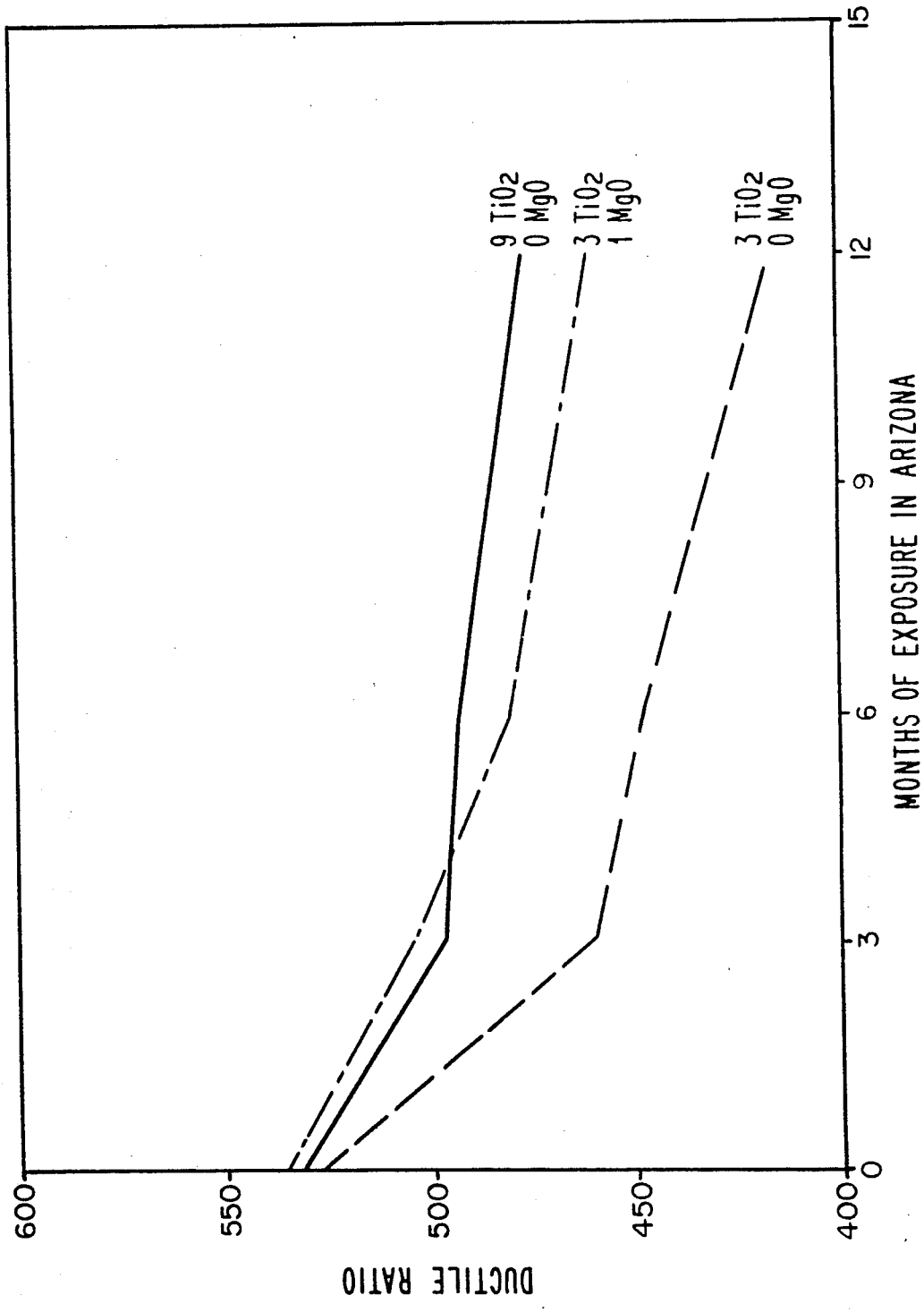
FIG. 1 is a graphical representation showing the measured ductile ratio of the compositions of Example 4 and Comparative Examples 1 and 2 as a function of the length of exterior exposure.

The unplasticized polyvinyl chloride compositions of the present invention include at least one extrusion-grade polyvinyl chloride resin. By "polyvinyl chloride resin" is meant homopolymers of vinyl chloride ("PVC"), post-chlorinated polymers of vinyl chloride ("CPVC"), copolymers of vinyl chloride and/or one or more other chlorinated vinyl monomers with one or more other copolymerizable monomers, including random, block, and graft copolymers, and blends of such homo- and/or copolymers with other polymers. By "unplasticized" is meant substantially free of plasticizer which is liquid at ambient temperature.

Examples of polyvinyl chloride homopolymers which can be used include those conforming to American Society for Testing Materials' standard specification D 1755-81 and designated as type GP (General Purpose). Examples of suitable type GP polyvinyl chloride resins include those having cell numbers 4-16043, 4-17240, 4-15350, 4-16340, 14413, 12454C, 12456, 13344C, 13444, 13454C, 16344, 16354, and 16344, the cell numbers having the meaning defined by ASTM D-1755-81 (Table 1).

Examples of random copolymers are those which are polymerized from vinyl chloride and up to about 40% by weight, preferably up to about 20% by weight, of a copolymerizable mono-alpha,beta-ethylenically unsaturated comonomer, or blend or alloy thereof, such as $C_2$-$C_8$- (and preferably $C_2$-$C_4$-) alpha-olefins (such as ethylene, propylene, 1-butene, 1-hexene, and the like), $C_1$-$C_{10}$-(and preferably $C_2$-$C_8$-) alkyl acrylates (such as methyl acrylate, ethyl acrylate, n-butyl acrylate, and the like), vinylidene chloride, vinyl acetate, acrylonitrile, acrylamides, styrenes and substituted styrenes, and the like.

Examples of blends include blends of PVC with chlorinated polyethylene, with polyacrylate, with polyacrylate and chlorinated polyethylene with chlorosulfonated polyethylene, and with chlorinated polyethylene and vinyl acetate-ethylene-carbon monoxide terpolymer.

Conventional polyvinyl chloride compounding and extrusion equipment can be used to compound the unplasticized polyvinyl chloride composition of the present invention and to extrude siding, shingles, window shutters, and/or profile products such as structural shapes for windows and other exterior products. For example, Conventional twin screw and single screw extruders can be used. The unplasticized polyvinyl chloride compositions of the present invention can be extruded to form articles, such as window profiles, coextruded with other compositions to form articles, such as house siding with an exterior layer formed from the composition of the present invention, or extrusion-coated on stock materials, such as wood or aluminum, to form articles, such as reinforced profiles for large windows, door frames, and the like. Similarly, conventional post-extrusion downstream equipment, such as embossers, hauloffs, cutoffs, die-presses, and the like, can be used.

The polyvinyl chloride resin is preferably a powder, chip, cubed, or pellet grade material which can be easily processed in conventional compounding and extrusion equipment. For example, the polyvinyl chloride resin can be a cubed resin suitable for use in a single-screw extruder or a powder resin suitable for use in a twin-screw extruder. The resin powder, chips, cubes or pellets can include a predispersed colorant to provide, for example, a pastel or dark hue to the unplasticized polyvinyl chloride composition.

The unplasticized polyvinyl chloride composition also preferably includes one or more heat stabilizers or a heat stabilization system. For example, a conventional barium/cadmium or barium/cadmium/zinc stabilizer can be used. Organotin compounds, such as those commercially available in the United States, can also be used. Examples of organotin compounds include dibutyltin dilaurate, dibutyltin maleate, modified butyltin maleates, butyltin mercaptocarboxylic acids, octytin modified maleates, such as di-n-octyltin maleate polymer, octyltin mercaptocarboxylic acids, such as di-n-octyltin S,S'bis(isooctyl)mercaptoacetate and mono-octyltin tri(iso-octyl)-mercaptoacetate, alkyltin thioglycolates such as mono/dimethyltin iso-octyltin thioglycolate and dialkyltin allyl thioglycolates, and dialkyltin allyl mercaptides. Preferably, an organotin carboxylate or mercaptide, such as an organotin derivative of 2-mercaptoethanol or an alkyl ester of thioglycolic acid, such as an octyl ester of thioglycolic acid, is used. The organotin stabilizer can be a methyltin, butyltin, octyltin, or like derivative. When an organotin stabilizer is employed, it is preferably used at a level of from about 0.1–3 parts by weight per hundred parts by weight of the unplasticized polyvinyl chloride resin ("phr"), and more preferably from about 0.25–1.5 phr.

The unplasticized polyvinyl chloride compositions of the present invention also preferably include one or more impact modifiers such as acrylic copolymers, acrylonitrile-butadiene-styrene resins, ethylene-vinyl acetate copolymers, chlorinated polyethylenes, styrene-maleic anydride copolymers, fumaric ester copolymers, and alkyl graft copolymers. Suitable impact modifiers are available from Rohm and Haas Company, Philadelphia, Pa. under the trademark "Acryloid ®" in the KM series, such as Acryloid KM-946, KM-334 and KM-323 impact modifiers. Impact modifier may be used at a level from about 0.3–20 phr and preferably at from about 0.5–8 phr.

The unplasticized polyvinyl chloride compositions of the present invention can also include one or more processing aids such as low viscosity, compatible acrylic copolymers, acrylonitrile-styrene-acrylate resins and chlorinated polyethylenes. Examples of such processing aids include imidized acrylic heat distortion modifiers. Similarly, lubricants can be included in the composition. Examples of such lubricants include stearates such as calcium, aluminum, barium, cadmium, lead, sodium, zinc and magnesium stearates, ethylene bis-stearamide waxes, paraffin waxes, fatty acids and derivatives such as fatty acid amides and esters, fatty alcohols, glycerol esters, glycol esters, polyethylene waxes, petrolatum, wax esters, amorphous polypropylene, and synthetic wax soaps. Preferably, however, such processing aids are employed at low levels, typically less than about 10 phr.

The ultraviolet stabilization system employed in the compositions of the present invention includes titanium dioxide and magnesium oxide. Preferably, a rutile titanium dioxide is employed at a level of from about 0.2–15 phr, preferably at a level of from about 0.5 to 5 phr, and more preferably at a level of from about 0.5 to 3 phr, and has an average particle size of from about 0.1 to 2.0 micron, preferably from about 0.1 to 0.4 micron. Rutile titanium dioxide is preferred for its ultraviolet absorption characteristics and chalk-resistance. Suitable grades of titanium dioxide are available from NL Industries, such as NL 2071, and from E.I DuPont de Nemours, such as R 960.

Preferably, the magnesium oxide is employed at a level of less than about 5 phr, and preferably at a level of less than about 2 phr. Suitable grades of magnesium oxide are from Harwick Chemical Corp. under the trademark Stan-Mag and the grade designations AG, MLW, and 112. It is especially preferred that a magnesium oxide having a small average particle size, such as Stan-Mag AG, which has a mean particle size of 2.20 microns, be employed. When a small particle size magnesium oxide is used, less magnesium oxide need be employed and the beneficial effect is more pronounced.

While the beneficial effects of the inclusion of magnesium oxide appear to increase with decreasing magnesium oxide particle size, there may be a practical lower limit to magnesium oxide particle size. For example, using magnesium oxide having a mean particle size significantly less than 2.0 microns may require significant reformulation and/or result in a PVC composition which is difficult to process and extrude, and/or which provides an extruded profile which has unacceptably high modulus or other unacceptable physical properties.

Small amounts of other ultraviolet stabilizers can also be included if desired. For example, substituted benzotriazoles, such as the 2-hydroxyphenylbenzotriazoles, benzophenones, such as the 2-hydroxy-4-alkoxybenzopheones, acrylonitriles, salicylates, cyanoacrylates, benzilidenes, malonates, oxalanilides, hindered-amines, and the like, can be used.

If desired small amounts of extender pigments or fillers, including small particle size calcium carbonate, kaolin, mica, silica, microspheres, and talc can be included in the unplasticized polyvinyl chloride composition.

The unplasticized polyvinyl chloride composition of the present invention can be used to extrude a variety of profiles, including window profiles, for extruding siding products, as a capstock in the coextrusion of a variety of products, and similarly can be extrusion coated on a variety of preformed stock materials such as wood, aluminum, glass fiber and the like.

The following examples are illustrative of the improved composition of the present invention that will be useful to one of ordinary skill in the art in practicing the invention. However, the invention is in no way limited by these examples.

EXAMPLES 1–4

Unplasticized polyvinyl chloride compositions were prepared by delivering the components shown in Table 1 in the portions indicated to the feed hopper of a KMD 90 twin-screw extruder operating at a rate of about 205 lb/hr and a maximum temperature of below about 360° F. to prepare the compositions of Examples 1-4 and Comparative Example 1.

A window sash profile having a thickness of about 1.8 mm was extruded at a haul off rate of about 3.1 m/min. using the unplasticized polyvinyl chloride compositions of Comparative Example 1 and each of Examples 1 through 4. The extrusion of each of the examples was unremarkable, except that Example 4 extruded with a high gloss and flexible sCrew boss. The flexural modulus of each of the examples was measured using ASTM D 790 method. Rheological properties were measured using a Haake Beuchler rheometer.

One foot long samples were cut from each of the extruded lineals. One set of samples was exposed at an exterior test site in Arizona and a second set of samples was exposed at an exterior test site in Florida, for varying periods of time (45° South exposure). Subsequently, bow tie-shaped test specimens were cut from the profile samples following ASTM D638 and the mechanical properties of the test specimens so formed were measured using a Instron testing machine at a cross-head speed of 20 in/min. The results of the exterior exposure on the mechanical properties are shown in Table 2.

FIG. 1 reports the ductile ratio versus months of exposure in Arizona for Comparative Example 1 and Example 4 and additionally includes data for a second comparative example including 9 phr titanium dioxide (Comparative Example 2).

TABLE 1

| Components | Comparative Example 1 | Example 1 | Example 2 | Example 3 | Example 4 |
|---|---|---|---|---|---|
| Polyvinyl chloride homopolymer[1] | 100.0 | 100.0 | 100.0 | 100.0 | 100.0 |
| Mark 2212 (14% tin) stabilizer[2] | 1.00 | 1.00 | 1.00 | 1.00 | 1.00 |
| CaSt 571 calcium stearate[3] | 2.20 | 2.20 | 2.20 | 2.20 | 2.20 |
| Hostalub TM XL 165SB (paraffin wax) lubricant[4] | 0.95 | 0.95 | 0.95 | 0.95 | 0.95 |
| NL 2071 TiO$_2$[5] | 3.00 | 3.00 | 3.00 | 3.00 | 3.00 |
| Acryloid ® KM 946 impact modifier[6] | 5.00 | 5.00 | 5.00 | 5.00 | 5.00 |
| Stan-Mag AG magnesium oxide[7] | 0 | 1.00 | 0 | 0 | 0 |
| Stan-Mag MLW magnesium oxide[8] | 0 | 0 | 1.00 | 0 | 3.00 |
| Stan-Mag 112 magnesium oxide[9] | 0 | 0 | 0 | 1.00 | 0 |
| Properties | | | | | |
| Specific gravity | 1.3856 | 1.3926 | 1.3926 | 1.3926 | 1.4064 |
| Flexural modulus[10] (× 10$^3$) | 376 | 407 | 390 | 375 | 478[11] |
| Rheological properties[12] | | | | | |
| Fusion Torque | 2321 | 2486 | 2693 | 2592 | 2325 |
| Fusion Temp. (°C.) | 186 | 182 | 179 | 187 | 184 |
| Fusion time (sec) | 62 | 48 | 53 | 60 | 44 |

TABLE 1-continued

| Components | Comparative Example 1 | Example 1 | Example 2 | Example 3 | Example 4 |
|---|---|---|---|---|---|
| Stability (min) | 14.2 | 10.7 | 14.3 | 14.3 | 11.3 |

[1] Medium molecular weight general purpose polyvinyl chloride homopolymer resin, having an intrinsic viscosity of 0.89, and prepared by bulk polymerization.
[2] Mark 2212 methyl mercaptide stabilizer available from Argus Division, Witco Corp., 633 Court Street, Brooklyn, NY 11231
[3] CaSt 5713 calcium stearate is available from Mallinkrodt.
[4] Hostalub XL 165SB paraffin wax lubricant is available from Hoechst Celanese.
[5] NL 2071 rutile titanium dioxide is available from NL Industries, Industrial Chemicals Div., P.O. Box 700, Wycoff Mills Road, Hightstown, NJ 08520.
[6] Acryloid ® KM-946 acrylic impact modifier is available from Rohm and Haas Company, Philadelphia, PA 19105.
[7] Stan-Mag AG is a magnesium oxide available from Harwick Chemical Corp., 60 Seiberling St., Akron, OH 44308, and having a mean particle size of 2.20 microns and a surface area of 146 m2/g.
[8] Stan-Mag MLW magnesium oxide has a mean particle size of 2.57 microns and a surface area of 96 $m^2/g$.
[9] Stan-Mag 112 magnesium oxide has a mean particle size of 2.87 microns and a surface area of 36 m2/g.
[10] Flexural modulus was measured by ASTM D 790 at room temperature.
[11] Flexural modulus was also measured for this sample at 71° C. (0.267) and 77.5° C. (0.112) in a heated water bath.
[12] Rheological properties were measured using a Haake Buchle torque rheometer.

Figure 2:
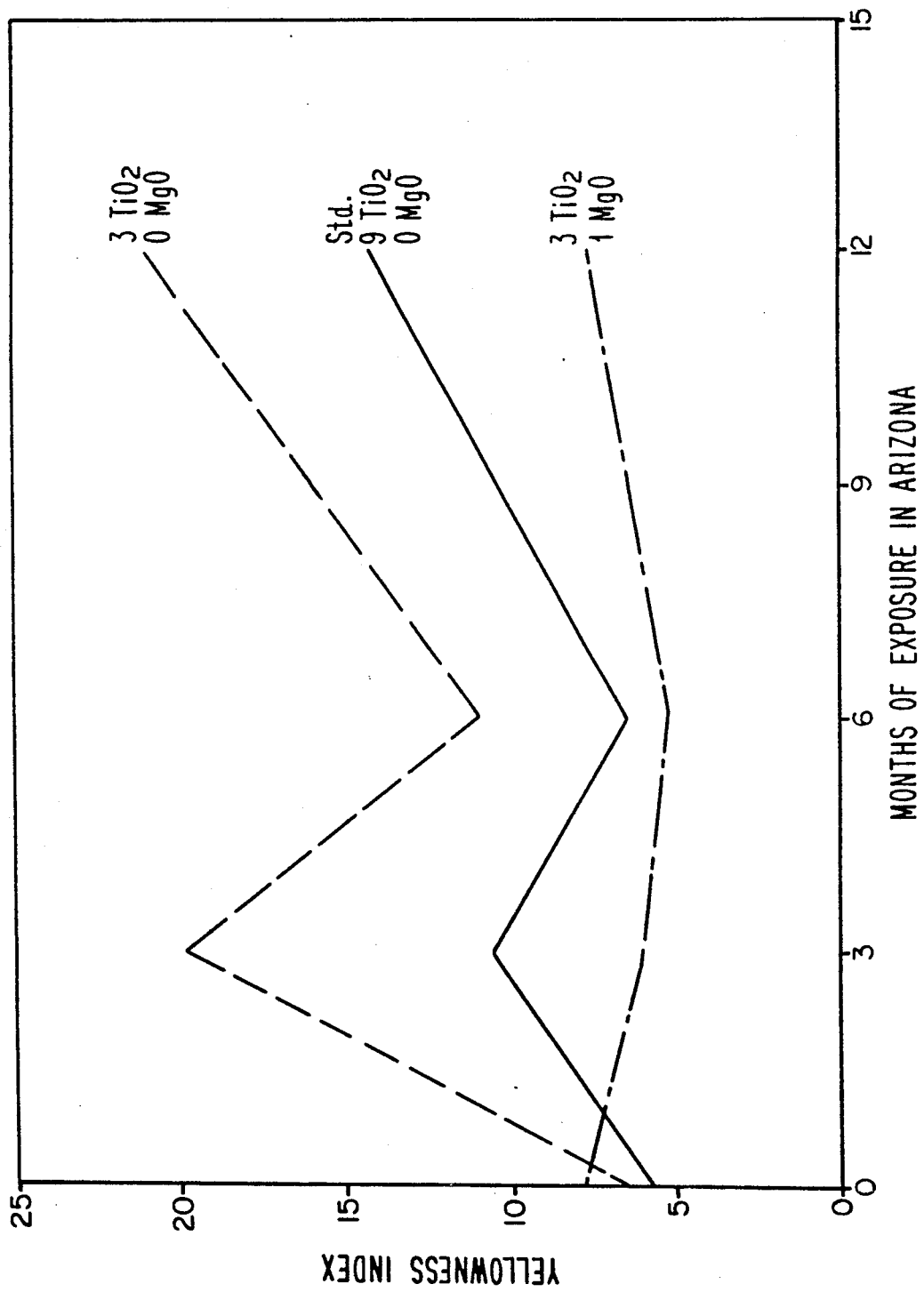
FIG. 2 is a graphical representation showing the measured yellowness index of the compositions of FIG. 1 as a function of the length of exterior exposure.

FIG. 2 reports yellowness index versus months of exposure in Arizona for the same examples and comparative examples.

The mechanical property data reported in Table 2 and in FIG. 1 show that the improved composition of the present invention is less sensitive to degradation induced by exterior exposure to ultraviolet light compared with a comparable composition without magnesium oxide, and provides performance comparable to a composition having three times the level of the expensive pigment titanium dioxide. Similarly, the data recorded in Table 2 shows that the unplasticized polyvinyl chloride compositions of the present invention have superior ultraviolet resistance when compared with similar compositions having no magnesium oxide and comparable or better performance, as measured by yellowness index, than a composition having three times the level of titanium dioxide and no magnesium oxide.

TABLE 2

| Example | Exposure length | Exposure location | Tensile[1] Strength | Ductile[2] Ratio | L[3] | Yi[4] |
|---|---|---|---|---|---|---|
| Comparative | None | None | 9099 | 5.28 | 93.04 | 6.34 |
| 1 | " | " | 9154 | 5.36 | 93.75 | 7.75 |
| 2 | " | " | 9256 | 5.28 | 93.50 | 6.98 |
| 3 | " | " | 9187 | 5.60 | 92.41 | 5.83 |
| 4 | " | " | 9398 | 5.20 | 91.85 | 8.12 |
| Comparative | 3 months | Arizona | 9380 | 4.60 | 90.77 | 19.88 |
| 1 | " | " | 9166 | 5.04 | 94.33 | 5.99 |
| 2 | " | " | 9185 | 5.08 | 92.77 | 12.53 |
| 3 | " | " | 9385 | 4.92 | 90.68 | 14.94 |
| 4 | " | " | 9539 | 4.92 | 90.68 | 12.84 |
| Comparative | 3 months | Florida | 9146 | 5.04 | 93.11 | 4.78 |
| 1 | " | " | 9220 | 5.16 | 93.59 | 5.20 |
| 2 | " | " | 9203 | 5.16 | 93.01 | 5.12 |
| 3 | " | " | 9336 | 5.04 | 91.67 | 5.65 |
| 4 | " | " | 9286 | 4.92 | 91.69 | 5.57 |
| Comparative | 6 months | Arizona | 9293 | 4.48 | 92.79 | 10.86 |
| 1 | " | " | 9397 | 4.80 | 94.73 | 5.14 |
| 2 | " | " | 9224 | 4.88 | 93.75 | 6.82 |
| 3 | " | " | 9343 | 4.84 | 92.86 | 6.56 |
| 4 | " | " | 9191 | 4.84 | 92.11 | 7.25 |
| Comparative | 6 months | Florida | 9171 | 5.12 | 92.58 | 4.65 |
| 1 | " | " | 9374 | 4.96 | 93.36 | 5.41 |
| 2 | " | " | 9432 | 5.08 | 92.40 | 6.21 |
| 3 | " | " | 9342 | 5.04 | 91.63 | 5.50 |
| 4 | " | " | 9296 | 4.64 | 90.94 | 6.35 |
| Comparative | 12 months | Arizona | 9677 | 4.16 | 89.63 | 21.08 |
| 1 | " | " | 9838 | 4.60 | 94.42 | 7.54 |
| 2 | " | " | 9752 | 4.68 | 92.58 | 15.02 |
| 3 | " | " | 9584 | 4.64 | 91.12 | 15.19 |
| 4 | " | " | 9732 | 4.20 | 91.49 | 9.46 |
| Comparative | 12 months | Florida | 9108 | 5.08 | 91.71 | 7.25 |
| 1 | " | " | 9912 | 4.72 | 92.45 | 7.26 |
| 2 | " | " | 9709 | 4.88 | 92.02 | 7.02 |
| 3 | " | " | 9541 | 4.80 | 91.43 | 6.34 |
| 4 | " | " | 9803 | 4.56 | 91.54 | 7.00 |
| Comparative | 18 months | Arizona | 9573 | 4.48 | | 13.57 |
| 1 | " | " | 9688 | 5.24 | | 11.37 |
| 2 | " | " | 9723 | 5.08 | | 10.60 |
| 3 | " | " | 9538 | 5.16 | | 10.26 |
| 4 | " | " | 9731 | 4.36 | | 13.86 |
| Comparative | 18 months | Florida | 9711 | 5.64 | | 6.31 |
| 1 | " | " | 9724 | 5.28 | | 6.03 |
| 2 | " | " | 9460 | 5.04 | | 5.65 |

TABLE 2-continued

| Example | Exposure length | Exposure location | Tensile[1] Strength | Ductile[2] Ratio | L[3] | Yi[4] |
|---|---|---|---|---|---|---|
| 3 | " | " | 9511 | 5.40 | | 6.73 |
| 4 | " | " | 9373 | 4.60 | | 7.44 |
| Comparative | 24 months | Arizona | 8718 | 3.80 | | 21.34 |
| 1 | " | " | 9062 | 4.64 | | 14.15 |
| 2 | " | " | 8973 | 4.48 | | 16.65 |
| 3 | " | " | 9079 | 4.72 | | 15.50 |
| 4 | " | " | 8573 | 4.18 | | 22.97 |
| Comparative | 24 months | Florida | 8765 | 4.64 | | 9.24 |
| 1 | " | " | 8812 | 5.00 | | 6.37 |
| 2 | " | " | 8950 | 5.24 | | 7.40 |
| 3 | " | " | 8665 | 4.72 | | 7.40 |
| 4 | " | " | 8561 | 4.60 | | 7.32 |

[1] p.s.i.
[2] Ratio of p.s.i. peak height to peak width at 50% height
[3] Hunter L
[4] Hunter yellowness index

EXAMPLES 5-7

Additional unplasticized polyvinylchloride compositions were prepared according to process of Examples 1-4 using the formulas shown in Table 3 to give Comparative Example 3 and Examples 5-7. Eight inch wide siding (square 8" die) was extruded at 400 lb./hr. and a haul off rate of about 56 m/min. using these compositions, and samples were cut from the extrusions. These were subjected to exterior exposure in Arizona and Florida for up to sixty months as shown in Table 4, and yellowness index, Hunter L reflectance, and impact properties were measured, and are reported in Table 4.

TABLE 3

| Components | Comparative Example 3 | Example 5 | Example 6 | Example 7 |
|---|---|---|---|---|
| Polyvinyl chloride homopolymer[1] | 100 | 100 | 100 | 100 |
| Mark 2212 (14% tin stabilyer)[2] | 1.00 | 1.00 | 1.00 | 1.00 |
| CaSt calcium stearate[3] | 2.00 | 2.00 | 2.00 | 2.00 |
| Hostalub ™ XL 165 STS (paraffin wax)[4] | 0.95 | 0.95 | 0.95 | 0.95 |
| Acryloid ® KM-323B impact modifier[5] | 7.00 | 7.00 | 7.00 | 7.00 |
| Acryloid ® K 125 processing aid[6] | 0.70 | 0.70 | 0.70 | 0.70 |
| Acryloid ® K 175 processing aid[7] | 0.50 | 0.50 | 0.50 | 0.50 |
| R-69 titanium dioxide[8] | 10.0 | 10.0 | 10.0 | 10.0 |
| MgO[9] | 0 | 0.1 | 0.2 | 0.5 |
| Physical properties | | | | |
| Yellowness index | 5.26 | 5.32 | 5.45 | 5.56 |
| Hunter L | 95.18 | 95.18 | 94.90 | 95.18 |
| a | −0.63 | −0.67 | −0.68 | −0.71 |
| b | 2.90 | 2.94 | 3.01 | 3.09 |
| Rheological characteristics[10] | | | | |
| Fusion (minutes) | 1.0 | 0.9 | 1.0 | 1.0 |
| Stability (minutes) | 31.4 | 36.7 | 32.5 | 29.2 |
| Torque | | | | |
| Peak | 2413 | 2438 | 2563 | 2525 |
| 10 Minutes | 2138 | 2175 | 2200 | 2250 |
| 20 Minutes | 2000 | 2025 | 2050 | 2000 |
| 30 Minutes | 1800 | 1763 | 1825 | — |
| Degradation | 1763 | 1750 | 1800 | 1925 |
| Run Order | 6 | 7 | 8 | 3 |
| Loading (grams) | 57 | 57 | 57 | 57 |

[1] Medium molecular weight general purpose polyvinyl chloride homopolymer resin, having an intrinsic viscosity of 0.89, and prepared by bulk polymerization.
[2] Mark 2212 methyl mercaptide stabilizer available from Argus Division, Witco Corp., 633 Court Street, Brooklyn, NY 11231.
[3] CaSt 5713 calcium stearate is available from Mallinkrodt.
[4] Hostalub XL 165SB paraffin wax lubricant is available from Hoechst Celanese.
[5] Acryloid ® KM-323B impact modifier is available from Rohm and Haas Co.
[6] Acryloid ® K 125 is an acrylic processing aid available from Rohm and Haas Co.
[7] Acryloid ® K 175 is a styrene/acrylate processing aid available from Rohm and Haas Co.
[8] R-69 is a "chalking" grade of titanium dixoide available from Glidden.
[9] Stan-Mag ™ MLW magnesium oxide is available from Harwick.
[10] Rheological properties of the extrusions were evaluted used a Brabender Plasticorder torque rheometer.

TABLE 4

| | Comparative Example 3 | Example 5 | Example 6 | Example 7 |
|---|---|---|---|---|
| Yellowness index at Florida | | | | |
| Control (0 mo.) | 5.26 | 5.32 | 5.45 | 5.56 |
| 3 mo. | 6.94 | 5.30 | 5.02 | 4.88 |
| 6 mo. | 5.55 | 4.60 | 5.21 | 4.79 |
| 12 mo. | 6.16 | 5.09 | 5.19 | 4.76 |
| 18 mo. | 10.22 | 6.84 | 6.63 | 6.54 |
| 24 mo. | 7.76 | 5.56 | 5.28 | 5.22 |
| 36 mo. | 8.58 | 5.73 | 5.19 | 5.05 |
| 48 mo. | 11.71 | 8.34 | 7.88 | 7.50 |
| 60 mo. | 7.63 | 4.80 | 5.14 | 4.86 |
| Hunter L at Florida | | | | |
| Control (0 mo.) | 95.2 | 95.2 | 94.9 | 95.2 |
| 3 mo. | 93.9 | 84.2 | 94.4 | 94.5 |
| 6 mo. | 94.3 | 94.4 | 93.8 | 94.2 |
| 12 mo. | 94.7 | 94.8 | 94.7 | 95.1 |
| 18 mo. | 94.0 | 94.9 | 94.7 | 94.5 |
| 24 mo. | 94.4 | 94.7 | 94.5 | 94.7 |
| 36 mo. | 93.0 | 94.1 | 93.8 | 94.1 |
| 48 mo. | 91.1 | 92.8 | 92.4 | 92.4 |
| 60 mo. | 93.7 | 94.2 | 93.7 | 94.0 |
| Hunter L at Arizona | | | | |
| Control (0 mo.) | 95.2 | 95.2 | 94.9 | 95.2 |
| 3 mo. | 93.4 | 94.1 | 93.3 | 93.3 |
| 6 mo. | 92.9 | 93.9 | 93.8 | 94.4 |
| 12 mo. | 94.2 | 95.1 | 95.1 | 95.6 |
| 18 mo. | 90.1 | 92.3 | 92.2 | 93.6 |
| 24 mo. | 88.0 | 91.2 | 92.9 | 93.5 |
| 36 mo. | 90.4 | 92.3 | 92.2 | 93.7 |
| 48 mo. | 88.2 | 90.9 | 87.9 | 92.2 |
| 60 mo. | 88.7 | 89.4 | 89.9 | 91.9 |
| Impact properties (Arizona) | | | | |
| Control (0 mo.) | 2.84 D | 2.82 D | 2.89 D | 2.71 D |

TABLE 4-continued

|  | Comparative Example 3 | Example 5 | Example 6 | Example 7 |
|---|---|---|---|---|
| 3 mo. | 2.55 D | 7.50 D | 7.50 D | 7.85 D |
| 6 mo. | 7.09 D | 2.15 D | 2.13 D | 7.19 D |
| 12 mo. | 1.36 C | 1.66 C | 1.74 C | 2.15 C |
| 18 mo. | 0.47 C | 0.93 C | 1.14 C | 1.64 C |
| 24 mo. | 1.70 D | 1.76 D | 2.20 C+ | 2.25 D |
| 36 mo. | 1.42 C | 1.56 C+ | 1.17 C+ | 1.96 D |
| 48 mo. | 1.46 C+ | 0.98 C | 1.28 C | 1.80 D− |
| 60 mo. | 0.81 C | 1.14 C | 1.19 C | 1.60 D− |
| Impact properties (Florida) | | | | |
| Control (0 mo.) | 2.84 D | 2.82 D | 2.89 D | 2.71 D |
| 3 mo. | 2.60 D | 2.57 D | 7.59 D | 2.42 D |
| 6 mo. | 2.60 D | 2.67 D | 7.81 D | 2.72 D |
| 12 mo. | 2.35 D | 2.40 D | 2.41 D | 2.56 D |
| 18 mo. | 2.47 C+ | 2.45 C | 7.61 C | 2.27 C |
| 24 mo. | 2.57 C | 2.61 D | 2.20 C+ | 2.25 D |
| 36 mo. | 2.35 D | 2.33 D | 2.42 D | 2.30 D |
| 48 mo. | 1.62 D | 7.24 D | 7.06 D | 7.27 D |
| 60 mo. | 1.72 D | 1.91 C+ | 1.07 C | 1.72 C |

Impact testing was carried out using a falling dart siding impact tester. Average inch-lb./mil of failure is reported. The type of failure (D=ductile, C=castastrophic) is reported.

All color tests are done on an instrument reading Hunter Lab equivalent delta L, a, b, and e. All weathering is done with test specimens oriented at 45 degrees South exposure.

Impact measurements showed that addition of 0.5 phr magnesium oxide increased impact strength retention after exterior exposure. Examples 7 retained 59% of its impact strength while Comparative Example 3 retained only 29% of its impact strength after 60 months exposure in Arizona. The data given in Table 4 show that exposure-induced yellowing is reduced and whiteness retention, as measured by Hunter L reflectance, is increased, by addition of magnesium oxide.

EXAMPLES 8-13

Additional unplasticized polyvinyl chloride compositions were prepared by delivering the components shown in Table 5 to the feed hopper of a KMD 90 extruder and extruding window frame profiles using a conventional PVC extrusion temperature profile. Two basic formulations, a white formulation (Comparative Examples 4 and 5 and Examples 8-11) and a tan formulation (Comparative Examples 6 and 7 and Examples 12 and 13) were employed. The white formulation included a "chalking" grade of titanium dioxide, while the tan formulation included a "non-chalking" grade of titanium dixoide and sufficient tan color concentrate to provide tan-colored extrusion profiles with approximate Hunter color coordinates of L=76.1, a=−104 and b=10.9. The resulting profiles were exposed at locations in Kentucky, Florida, and Arizona (45°, South). The effect of the exterior exposure on the yellowness index of the samples prepared using the white formulation and the effects of the exposure on the measured fading of the tan color and chalking for the tan profiles are given in Table 6. The effect on the mechanical properties of the samples is given in Table 7.

TABLE 5

| | White Base Formulation | | | | | |
|---|---|---|---|---|---|---|
| Components | Comparative Example 4 | Example 8 | Example 9 | Example 10 | Example 11 | Comparative Example 5 |
| Polyvinyl chloride homopolymer[1] | 100.000 | 100.000 | 100.000 | 100.000 | 100.000 | 100.000 |
| T 175[2] | 1.000 | 1.000 | 1.000 | 1.000 | 1.000 | 1.000 |
| CaSt 5871[3] | 2.000 | 2.000 | 2.000 | 2.000 | 2.000 | 2.000 |
| NL 2071[4] | 9.000 | 3.000 | 3.000 | 3.000 | 2.000 | 3.000 |
| XL 165 SB[5] | 0.950 | 0.950 | 0.950 | 0.950 | 0.950 | 0.95 |
| KM 946[6] | 6.000 | 6.000 | 6.000 | 6.000 | 6.000 | 6.000 |
| K 127[7] | 0.200 | 0.200 | 0.200 | 0.200 | 0.200 | 0.200 |
| STAN-MAG AG[8] | 0.000 | 1.000 | 0.750 | 0.500 | 1.000 | 0.000 |
| R 960[9] | 0.000 | 0.000 | 0.000 | 0.000 | 0.000 | 0.000 |
| Specific gravity | 1.4299 | 1.3885 | 1.3868 | 1.3850 | 1.3803 | 1.316 |

| | Tan Base Formulation | | | |
|---|---|---|---|---|
| | Comparative Example 6 | Example 12 | Example 13 | Comparative Example 7 |
| Polyvinyl chloride homopolymer[1] | 100.000 | 100.000 | 100.000 | 100.000 |
| T 175[2] | 1.000 | 1.000 | 1.000 | 1.000 |
| CaSt 5871[3] | 2.000 | 2.000 | 2.000 | 2.000 |
| NL 2071[4] | 0.000 | 0.000 | 0.000 | 0.000 |
| XL 165 SB[5] | 0.950 | 0.950 | 0.950 | 0.950 |
| KM 946[6] | 6.000 | 6.000 | 6.000 | 6.000 |
| K 127[7] | 0.200 | 0.200 | 0.200 | 0.200 |
| STAN-MAG AG[8] | 0.000 | 1.000 | 0.500 | 0.000 |
| R 960[9] | 8.000 | 3.000 | 3.000 | 3.000 |
| Specific gravity | 1.4212 | 1.3882 | 1.3847 | 1.3813 |

[1]Medium molecular weight general purpose polyvinyl chloride homopolymer resin, having an intrinsic viscosity of 0.89, and prepared by bulk polymerization.
[2]T-175 is a butyltin sulfur containing stabilizer available from M & T chemicals.
[3]CaSt 5713 calcium stearate is available from Mallinkrodt.
[4]NL 2071 is a chalking grade of titanium dioxide available from NL Industries.
[6]Acryloid ® KM-946 acrylic impact modifier is available from Rohm and Haas Company, Philadelphia, PA 19105.
[7]Acryloid ® K 127 acrylic processing aid is available from Rohm and Haas Co.
[8]Stan-Mag AG magnesium oxide has a mean particle size of 2.20 microns and a surface area of 146 m$^2$/g.
[9]R 960 is a non-chalking grade of titanium dioxide available from E. I. DuPont de Nemours.

TABLE 6

| | WHITE | | | | | |
|---|---|---|---|---|---|---|
| | Comp. Ex. 4 | Example 8 | Example 9 | Example 10 | Example 11 | Comp. Ex. 5 |
| TiO$_2$ phr | 9 | 3 | 3 | 3 | 2 | 3 |
| MgO phr | 0 | 1 | 0.75 | 0.5 | 1 | 0 |
| Yellowness[1] | | | | | | |

TABLE 6-continued

| Index | | | | | | |
|---|---|---|---|---|---|---|
| Initial | 4.89 | 10.45 | 9.90 | 8.28 | 12.18 | 8.12 |
|  | 4.92 | 12.89 | 9.81 | 9.17 | 10.88 | 7.80 |
| Arizona | | | | | | |
| 3 months | 18.04 | 8.51 | 9.15 | 11.24 | 9.02 | 22.42 |
|  | 15.54 | 7.16 | 7.01 | 8.07 | 7.43 | 15.37 |
| 6 months | 15.55 | 19.45 | 21.66 | 24.14 | 28.18 | 31.42 |
| 12 months | 12.20 | 13.43 | 26.77 | 27.26 | 31.62 | 32.77 |
| Florida | | | | | | |
| 3 months | 6.80 | 7.41 | 6.69 | 6.21 | 7.28 | 8.06 |
|  | 6.15 | 6.85 | 6.40 | 5.92 | 7.29 | 6.46 |
| 6 months | 6.18 | 7.14 | 6.39 | 6.17 | 7.33 | 5.45 |
| 12 months | 6.69 | 7.11 | 6.90 | 6.83 | 9.76 | 7.20 |
| Kentucky | | | | | | |
| 3 months | 14.20 | 8.10 | 8.66 | 8.60 | 9.23 | 25.47 |
|  | 12.17 | 7.50 | 7.35 | 7.09 | 7.72 | 9.20 |
| 6 months | 7.77 | 9.37 | 7.62 | 7.65 | 9.20 | 8.43 |
| 12 months | 7.36 | 7.11 | 6.65 | 6.84 | 8.48 | 6.26 |

| TAN | | | | |
|---|---|---|---|---|
|  | Comp. Ex. 6 | Example 12 | Example 13 | Comp. Ex. 7 |
| TiO$_2$ phr | 8 | 3 | 3 | 3 |
| MgO phr | 0 | 1 | .5 | 0 |
| Fading[2] | | | | |
| Arizona | | | | |
| 3 month | 1.51[4] | 0.94 | 0.58 | 4.95 |
|  | 0.73 | 0.88 | 0.50 | 2.22 |
| 6 month | 2.02 | 4.44 | 6.22 | 7.23 |
| 12 month | 2.90 | 11.44 | 15.21 | 19.32 |
| Florida | | | | |
| 3 month | 1.80 | 1.27 | 0.98 | 0.39 |
|  | 0.45 | 1.07 | 0.76 | 0.78 |
| 6 month | 0.57 | 1.55 | 1.19 | 1.29 |
| 12 month | 0.50 | 1.50 | 1.02 | 1.23 |
| Kentucky | | | | |
| 3 month | 1.25 | 0.57 | 0.49 | 2.38 |
|  | 0.46 | 0.88 | 0.71 | 2.15 |
| 6 month | 0.23 | 0.84 | 0.97 | 0.70 |
| 12 month | 0.22 | 1.20 | 0.91 | 0.58 |
| Chalking[3] | | | | |
| Arizona | | | | |
| 3 month | 0.60 | 1.56 | 0.28 | 0.36 |
|  | 1.21 | 0.33 | 0.55 | 1.60 |
| 6 month | 0.17 | 1.87 | 2.36 | 1.21 |
| 12 month | 0.70 | 1.48 | 2.75 | 2.39 |
| Florida | | | | |
| 3 month | 0.88 | 1.05 | 0.41 | 0.41 |
|  | 1.60 | 1.85 | 1.47 | 2.35 |
| 6 month | 1.47 | 1.33 | 2.31 | 2.23 |
| 12 month | 2.32 | 1.44 | 1.87 | 1.50 |
| Kentucky | | | | |
| 3 month | 4.56 | 2.62 | 2.64 | 8.27 |
|  | 2.64 | 1.35 | 0.26 | 1.22 |
| 6 month | 3.30 | 2.86 | 4.44 | 4.48 |
| 12 month | 3.20 | 4.40 | 5.21 | 5.90 |

[1]Hunter yellowness index
[2]Fading was measured using a Macbeth 1500 colorimeter with a Color-eye illuminant.
[3]Chalking was measured using a Macbeth 1500 colorimeter with a Color-eye illuminant.
[4]Upper readings for fading and chalking three month data were taken over a large flat area of the window profile extrusions, while the lower readings were taken over a narrow lip of the extrusions.

TABLE 7

| Mechanical Properties[1] | | | | | | |
|---|---|---|---|---|---|---|
| WHITE | | | | | | |
|  | Comp. Ex. 4 | Example 8 | Example 9 | Example 10 | Example 11 | Comp. Ex. 5 |
| TiO$_2$ phr | 9 | 3 | 3 | 3 | 2 | 3 |
| MgO phr | 0 | 1 | 0.75 | 0.5 | 1 | 0 |
| Initial | 8908 | 8812 | 8940 | 8862 | 8937 | 8921 |
|  | 6.60 | 6.84 | 6.84 | 6.92 | 7.04 | 6.92 |
| Arizona | | | | | | |
| 3 months | 8816 | 9110 | 9093 | 9071 | 9052 | 8904 |
|  | 5.68 | 5.44 | 5.52 | 5.92 | 6.20 | 5.92 |
| 6 months | 9060 | 9124 | 9172 | 9142 | 9206 | 9009 |
|  | 5.20 | 4.88 | 4.80 | 5.08 | 4.92 | 5.12 |
| Florida | | | | | | |
| 3 months | 8830 | 9210 | 9002 | 9013 | 8954 | 8933 |
|  | 5.84 | 5.68 | 6.24 | 5.52 | 6.20 | 6.32 |
| 6 months | 9049 | 9067 | 9210 | 9142 | 9254 | 8913 |
|  | 5.52 | 5.16 | 5.20 | 5.32 | 5.82 | 5.52 |
| Kentucky | | | | | | |
| 3 months | 8848 | 9208 | 9123 | 9053 | 8958 | 8815 |
|  | 5.84 | 5.84 | 6.00 | 6.08 | 6.32 | 6.12 |
| 6 months | 8995 | 9328 | 9099 | 9046 | 9285 | 9142 |
|  | 5.36 | 5.20 | 5.44 | 5.52 | 5.40 | 5.36 |

| TAN | | | | |
|---|---|---|---|---|
|  | Comp. Ex. 6 | Example 12 | Example 13 | Comp. Ex. 7 |
| TiO$_2$ phr | 8 | 3 | 3 | 0 |
| MgO phr | 0 | 1 | .5 | 0 |
| Initial | 8830 | 8787 | 8638 | 8617 |
|  | 7.20 | 6.92 | 6.88 | 6.84 |
| Arizona | | | | |
| 3 month | 9044 | 9372 | 9181 | 9620 |
|  | 6.08 | 5.16 | 5.16 | 5.24 |
| 6 month | 8985 | 9138 | 9182 | 9203 |
|  | 4.84 | 4.52 | 4.56 | 4.80 |
| Florida | | | | |
| 3 month | 8825 | 9413 | 9192 | 9115 |
|  | 6.32 | 5.44 | 5.52 | 5.52 |
| 6 month | 8976 | 9189 | 9042 | 9157 |
|  | 5.32 | 5.16 | 5.20 | 5.08 |
| Kentucky | | | | |
| 3 month | 9050 | 9259 | 9174 | 9095 |
|  | 5.96 | 5.20 | 5.44 | 5.24 |
| 6 month | 9258 | 9462 | 9205 | 9258 |
|  | 4.92 | 4.88 | 5.04 | 4.88 |

[1]Upper figure is tensile strength; lower figure is ductile ratio.

From the results reported in Table 6, the addition of magnesium oxide appears effective in reducing yellowness development for the white Arizona and Kentucky samples, and in reducing fading and chalking for at least the tan samples, even at the 0.5 phr level. The data in Table 7 suggest that the addition of magnesium oxide does not significantly adversely affect the mechanical properties of the unplasticized PVC compositions.

Various modifications can be made in the details of the various embodiments of the compositions of the present invention, all within the spirit and scope of the invention as defined in the claims. For example, polymer blends including polyvinyl chloride can be used to prepare the unplasticized compositions, or the magnesium oxide can be incorporated in an uplasticized composition which is coextruded with another composition so that the resulting article has the magnesium oxide composition on at least a portion of its outer surface. Other modifications and embodiments will be readily apparent to those skilled in the art.

I claim:

1. An unplasticized polyvinyl chloride composition for forming articles for exterior use, and of the type having a polymerized or organic impact modifier, the composition comprising polyvinyl chloride resin, at least one thermal dehydrochlorination stabilizer, and an ultraviolet stabilization system, the ultraviolet stabilization system consisting essentially of from about 0.2–15 parts by weight of the polyvinyl chloride resin of rutile titanium dioxide and magnesium oxide, the weight ratio of titanium dioxide to magnesium oxide being from about 100:1 to 1:1.

2. An unplasticized polyvinyl chloride composition according to claim 1 wherein the the ultraviolet stabilization system includes less about 5 parts by weight of the polyvinyl chloride resin of magnesium oxide.

3. An unplasticized polyvinyl chloride composition according to claim 2 wherein the ultraviolet stabilization system consists essentially of from about 0.5-5 parts by weight of the polyvinyl chloride resin of rutile titanium dioxide and less than about 2 parts by weight of the polyvinyl chloride resin of magnesium oxide.

4. An unplasticized polyvinyl chloride composition according to claim 1 wherein the magnesium oxide has a mean particle size no greater than about 2.2 microns.

5. An unplasticized polyvinyl chloride composition according to claim 1 wherein the polymeric organic impact modifier is an acrylate derivative.

6. An unplasticized polyvinyl chloride composition according to claim 1 wherein the thermal dehydrochlorination stabilizer is an organotin sulfur-containing compound.

7. An unplasticized polyvinyl chloride composition according to claim 6 wherein the organotin sulfur-containing compound is an alkytin mercaptide.

8. An unplasticized polyvinyl chloride composition according to claim 6 wherein the sulfur-containing compound is an alkyltin thioglycolate.

9. An article formed from the composition of claim 1.

10. An extruded article according to claim 9.

11. Exterior siding formed from the composition of claim 1.

12. Exterior siding formed using a coextrusion process from at least two polymeric compositions, at least one being a composition according to claim 1.

13. An extruded component for a window formed from the composition of claim 1.

14. An extruded component for a doorframe formed from the composition of claim 1.

15. An unplasticized polyvinyl chloride composition for forming articles for exterior use, and of the type having a polymerized or organic impact modifier, the composition comprising polyvinyl chloride resin, at least one thermal dehydrochlorination stabilizer, and an ultraviolet stabilization system, the ultraviolet stabilization system consisting essentially of from about 0.2-15 parts by weight of the polyvinyl chloride resin of rutile titanium dioxide and magnesium oxide, the weight ratio of titanium dioxide to magnesium oxide being from about 100:1 to 1:1, comprising less than about 5 parts by weight of the polyvinyl chloride resin; the magnesium oxide having a mean particle size no greater than bout 2.2 microns; the polymeric organic impact modifier being an acrylate derivative; the thermal dehydrochlorination stabilizer being an organotin sulfur-containing compound.

* * * * *

UNITED STATES PATENT OFFICE
CERTIFICATE OF CORRECTION

Patent No. 5,030,676    Dated July 9, 1991

Inventor(s) J. Michael Wallen

It is certified that error appears in the above-identified patent and that said Letters Patent is hereby corrected as shown below:

Column 9, in Table 2 - continued, 11th row of the column labeled $Yi^4$, delete "7.40" and substitute therefore --5.97--.

Column 16, line 23, delete "bout" and substitute therefore --about--.

Signed and Sealed this

Sixth Day of October, 1992

Attest:

DOUGLAS B. COMER

*Attesting Officer*    *Acting Commissioner of Patents and Trademarks*